United States Patent [19]

Honsberg

[11] 4,181,648

[45] Jan. 1, 1980

[54] CURABLE COMPOSITION

[75] Inventor: Wolfgang Honsberg, Wilmington, Del.

[73] Assignee: E. I. Du Pont de Nemours and Company, Wilmington, Del.

[21] Appl. No.: 967,780

[22] Filed: Dec. 6, 1978

[51] Int. Cl.$^2$ ............................................... C08K 3/10
[52] U.S. Cl. .............................. 260/45.75 N; 525/354
[58] Field of Search ................... 260/45.75 N; 526/41

[56] References Cited

U.S. PATENT DOCUMENTS

| | | | |
|---|---|---|---|
| 2,538,047 | 1/1951 | Sanders et al. ................ | 260/45.75 N |
| 3,483,239 | 12/1969 | Hurlock et al. ............... | 260/45.75 N |

OTHER PUBLICATIONS

Du Pont HYPALON Synthetic Rubber, Bulletin No. 3B, Jan. 1969, cover page and p. 7.
Du Pont HYPALON Synthetic Rubber, Bulletin No. 2A, Jan. 1969, cover page and p. 19.

*Primary Examiner*—Hosea E. Taylor
*Assistant Examiner*—W. Thompson

[57] ABSTRACT

Chlorosulfonated polyethylene stabilized with nickel dibenzyldithiocarbamate is more resistant to scorch before curing than compositions with other heat stabilizers but has equal or better stability to degradation by heat after cure.

6 Claims, No Drawings

CURABLE COMPOSITION

BACKGROUND OF THE INVENTION

This invention relates to a novel curable composition of stabilized chlorosulfonated polyethylene.

Valuable elastomeric polymers are made by chlorosulfonating polyethylene. It is known that chlorosulfonated solid polymers of ethylene, which contain 25% to 45% chlorine and 0.4–3% sulfur, can be cured to form elastic products which have exceptional resistance to attack by oxygen, ozone and corrosive chemicals. Generally, the chlorosulfonated polymers are manufactured commercially by simultaneously chlorinating polyethylene to replace hydrogen by chlorine and reacting the chlorinated polyethylene with a mixture of chlorine and sulfur dioxide to introduce sulfonyl chloride groups into the chlorinated polymer.

After chlorosulfonated polyethylene is mixed with curing agents, for example, lead or magnesium oxide and sulfur or a sulfur donor, it has a tendency to scorch. By scorching is meant the premature vulcanization of the polymer. During storage the chlorosulfonated polyethylene may prematurely vulcanize. This renders the plastic properties of the polymer unsuitable for processing or the vulcanizate properties sought after are adversely affected. Because batches of chlorosulfonated polyethylene often are stored for relatively long periods of time before use, premature vulcanization during storage, sometimes referred to as "bin scorch", is a serious problem. In bin scorch the chlorosulfonated polyethylene takes the shape of the bin or container. Nickel dialkyldithiocarbamate stabilizers have been used to effectively prevent deterioration of properties during heat aging, but they have adversely affected bin stability and scorch resistance. There is a need for treating chlorosulfonated polyethylene so that it remains stable during storage and retains substantially the same Mooney viscosity throughout storage, while, at the same time, it exhibits superior resistance to heat aging and has good physical properties after it is cured.

SUMMARY OF THE INVENTION

It has been discovered that a curable chlorosulfonated polyethylene composition containing at least about 2 parts per 100 parts chlorosulfonated polyethylene of nickel dibenzyldithiocarbamate is resistant to scorching when compounded with other curing ingredients and, after curing, is resistant to heat aging. The process for stabilizing the curable chlorosulfonated polyethylene composition comprises adding at least about 2 parts per 100 parts chlorosulfonated polyethylene of nickel dibenzyldithiocarbamate to said chlorosulfonated polyethylene and uniformly mixing the ingredients.

DETAILED DESCRIPTION OF PREFERRED EMBODIMENTS

The curable chlorosulfonated polyethylene is stabilized by incorporating the stabilizing agent, nickel dibenzyldithiocarbamate, in the uncured rubber. The stabilizing agent is added to the uncured chlorosulfonated polyethylene at any time after synthesis, usually along with other compounding ingredients, such as fillers, pigments, plasticizers, processing aids and curing agents, that are added on a two-roll mill or in an internal mixer. Conventional curing agents are incorporated in the chlorosulfonated polyethylene and, usually, the curing agents used in the invention are those based on lead oxide or magnesium oxide combined with sulfur or sulfur donors and/or pentaerythritol. The temperature of the uncured rubber while compounding is kept below curing temperatures and, generally, is maintained at temperatures of from about 20° to 60° C., usually ambient temperature. At least about 2 parts of nickel dibenzyldithiocarbamate per 100 parts chlorosulfonated polyethylene is added to the chlorosulfonated polyethylene to adequately stabilize the rubber against heat aging. Larger amounts of stabilizer can be used, for example, 10 parts per 100 parts chlorosulfonated polyethylene; however, it usually is uneconomic to add that quantity and, preferably, no more than 5 parts nickel dibenzyldithiocarbamate per 100 parts chlorosulfonated polyethylene is used.

When compounding chlorosulfonated polyethylene in an internal mixer it is conventional practice to charge the mixer first with fillers, followed by curing agents, process aids, plasticizers and the polymer last. The stabilizing agent can be added at any time but conveniently it can be added with the filler. The ingredients are intimately mixed in about 4–5 minutes.

The following examples are given to illustrate the invention. Unless otherwise specified, the parts used are by weight.

The chlorosulfonated polyethylene is made according to the procedure described in U.S. Pat. No. 3,299,014. One hundred parts of curable chlorosulfonated polyethylene is compounded on a two-roll mill with the following ingredients, charged to the mill in the order listed: 40 parts SRF carbon black, 22 parts TLD-90*, 10 parts Maglite D (magnesium oxide), 0.5 part benzothiazyldisulfide (MBTS), 0.75 part dipentamethylenethiuram hexasulfide (TETRONE A) and 3 parts nickel dibenzyldithiocarbamate (NBZC) or, for comparison, 3 parts nickel di-n-butyldithiocarbamate (NBC) or 2.5 parts nickel dimethyldithiocarbamate (Methyl Niclate), all amounts based on 100 parts chlorosulfonated polyethylene. The temperature of the mix is held below about 60° C. and the ingredients are uniformly mixed in about 4 minutes. The compounded stocks containing the stabilizers are removed from the mill and the following tests conducted to determine their resistance to scorch and the stability of the cured compositions during heat aging.

*90 wt. % PbO (litharge) dispersion

|  | NBC | Methyl Niclate | NBZC |
|---|---|---|---|
| Mooney Scorch (MS at 121° C.) | | | |
| Original | | | |
| Mooney viscosity minimum value | 40 | 44 | 41 |
| Minutes to 10 point rise | 8 | 7.5 | 12 |
| Heat aged 7 days at 60° C. | | | |
| Mooney viscosity minimum value | Cured | 100 | 80 |
| Minutes to 10 point rise | | 9 | 15 |
| Stress-Strain Properties (cured 30 min at 150° C.) | | | |
| Original | | | |
| $M_{100}$ MPa(Psi) | 4.8( 700) | 10.3(1500) | 5.5( 800) |
| $M_{200}$ MPa(Psi) | 10.3(1500) | 21.7(3150) | 11.7(1700) |
| $T_B$ MPa(Psi) | 13.8(2000) | 23.1(3350) | 14.5(2100) |
| $E_B$ % | 405 | 220 | 370 |
| Heat Aged (7 days at 300° F. [149° C.]) | | | |
| $M_{100}$ MPa(Psi) | 6.5( 950) | 15.5(2250) | 6.5( 950) |
| $T_B$ MPa(Psi) 15.5(22250) | 17.9(2600) | 15.5(2250) | |

|  | NBC | Methyl Niclate | NBZC |
|---|---|---|---|
| $E_B$ (%) 250 | 110 | 240 |  |
| Retention of $E_B$ (%) | 62 | 50 | 65 |
| Compression Set (cured 30 min at 150° C.) |  |  |  |
| After 22 hrs at 70° C. (%) | 57 | 35 | 52 |

The above table shows the much improved resistance to scorch of chlorosulfonated polyethylene containing nickel dibenzyldithiocarbamate as compared to chlorosulfonated polyethylene containing nickel-di-n-butyldithiocarbamate and nickel dimethyldithiocarbamate. As indicated above, the stabilized composition of the present invention after heat aging for seven days at 60° C. has a minimum Mooney viscosity of 80 and 15 minutes was required to raise the Mooney viscosity 10 points. In contrast, the viscosity of the chlorosulfonated polyethylene containing nickel di-n-butyldithiocarbamate was not measurable and the chlorosulfonated polyethylene containing nickel dimethyldithiocarbamate had a minimum Mooney viscosity of 100 and only 9 minutes was needed to raise the Mooney viscosity 10 points.

I claim:
1. A curable composition comprising chlorosulfonated polyethylene containing at least about 2 parts per 100 parts chlorosulfonated polyethylene of nickel dibenzyldithiocarbamate.
2. A composition of claim 1 containing up to about 5 parts per 100 parts chlorosulfonated polyethylene of nickel dibenzyldithiocarbamate and curing agents.
3. A composition of claim 2 wherein the curing agents are lead oxide or magnesium oxide combined with sulfur or a sulfur donor.
4. A process for stabilizing a curable chlorosulfonated polyethylene composition which comprises adding at least about 2 parts per 100 parts chlorosulfonated polyethylene of nickel dibenzyldithiocarbamate to said chlorosulfonated polyethylene composition and uniformly mixing the ingredients.
5. A process of claim 4 wherein up to about 5 parts per 100 parts chlorosulfonated polyethylene of nickel dibenzyldithiocarbamate is added to said chlorosulfonated polyethylene composition containing curing agents.
6. A process of claim 4 wherein the curing agents are lead oxide or magnesium oxide combined with sulfur or a sulfur donor.